Oct. 11, 1927.  
C. H. AU  
1,645,273  
RECIPROCATING MECHANICAL MOVEMENT  
Original Filed Jan. 19, 1925   2 Sheets-Sheet 2
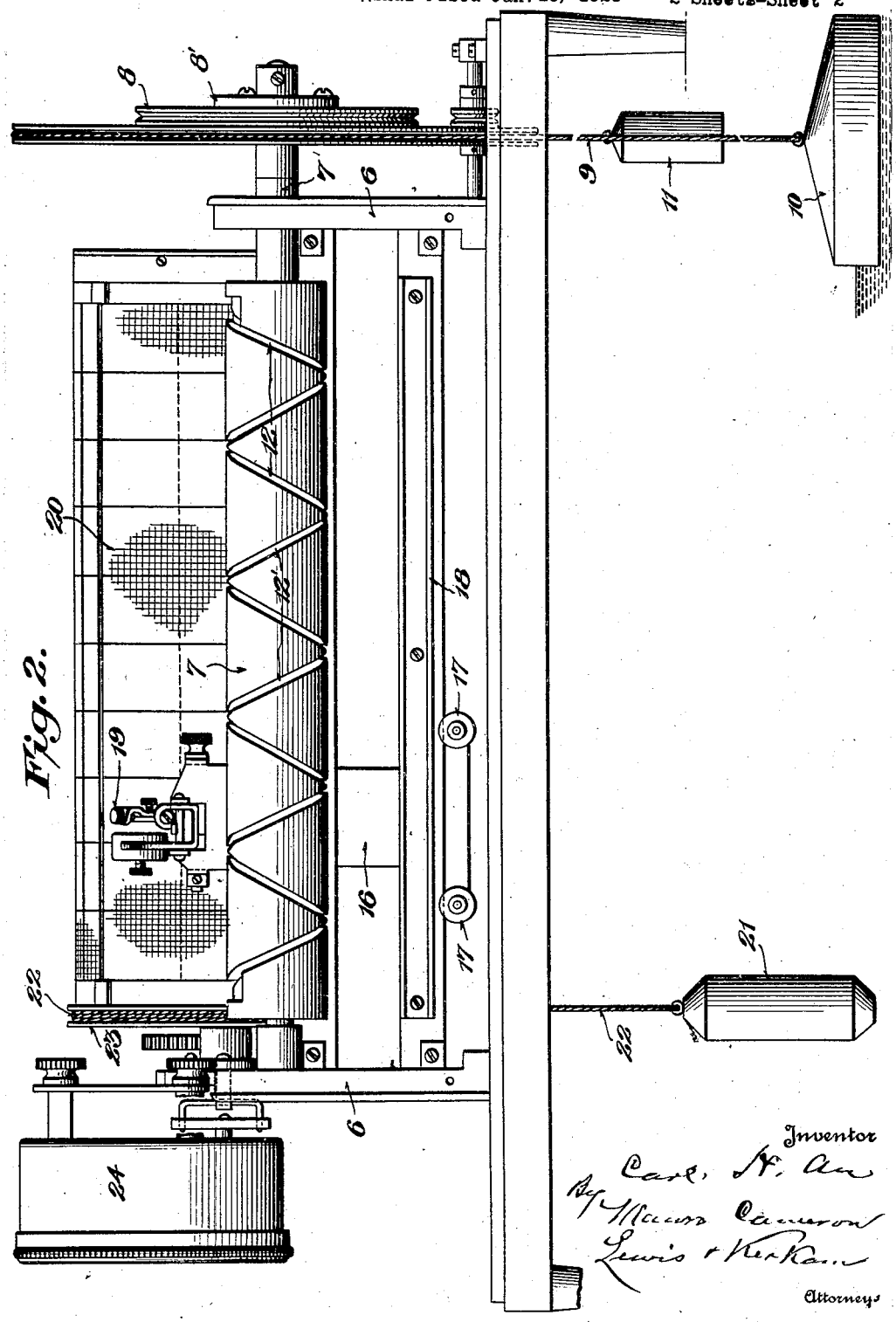

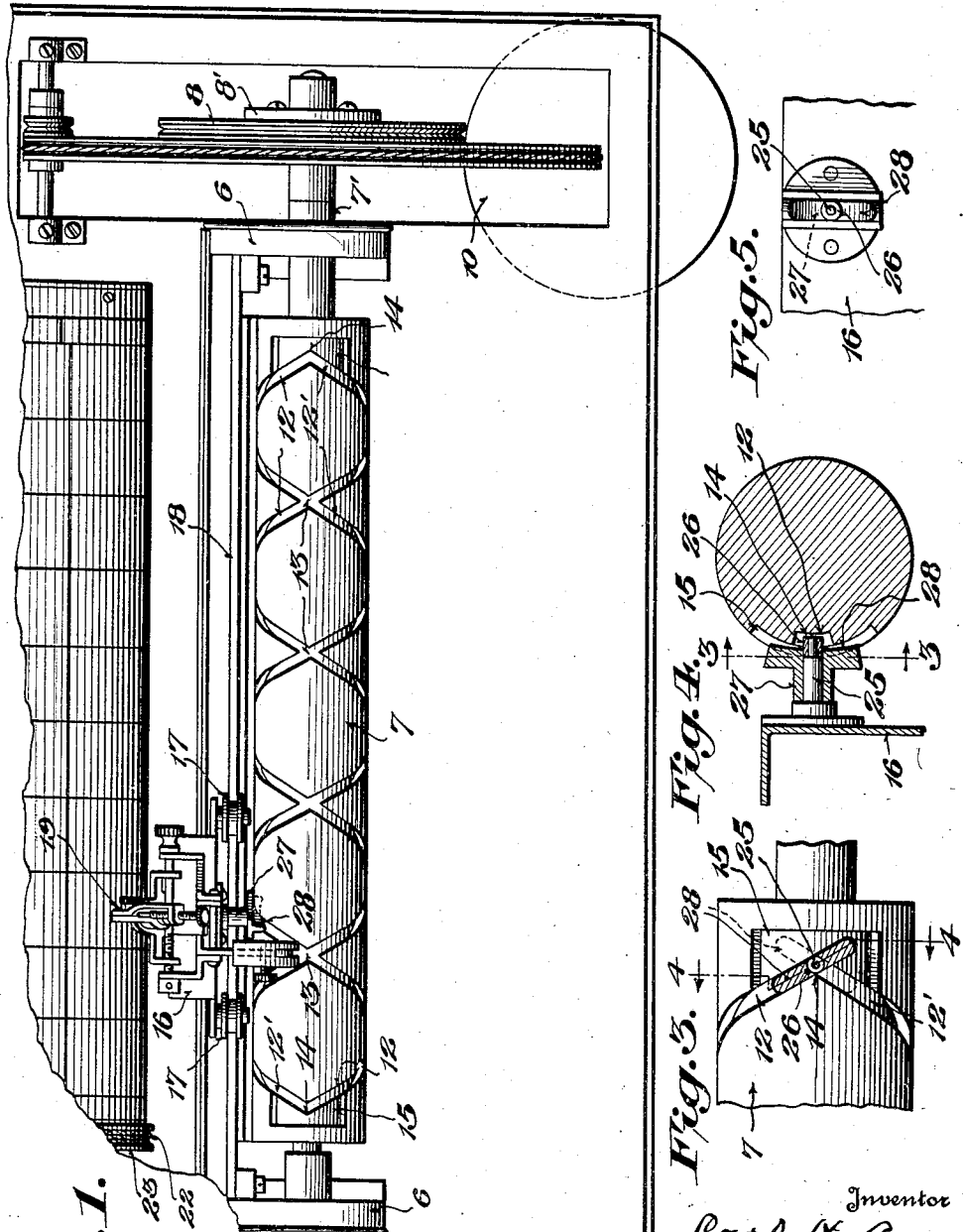

Patented Oct. 11, 1927.

1,645,273

UNITED STATES PATENT OFFICE.

CARL H. AU, OF WASHINGTON, DISTRICT OF COLUMBIA, ASSIGNOR OF ONE-HALF TO JOHN C. HOYT, OF WASHINGTON, DISTRICT OF COLUMBIA.

RECIPROCATING MECHANICAL MOVEMENT.

Original application filed January 19, 1925, Serial No. 3,440. Divided and this application filed January 5, 1926. Serial No. 79,430.

This invention relates to a mechanical movement, and more particularly to a mechanical movement designed to secure continuous reciprocating movement of a propelled part without disturbing the ratio of movement between the driving and the driven parts at the instant of the reversal of the movement, and is a division of my application Serial No. 3,440, filed January 19, 1925.

Efforts have heretofore been made to produce a mechanical movement of the general character of the present invention in which the reciprocating motion is secured through the reaction of a continuous screw, but so far as I am aware in all such constructions there results, at the point where the reversal of the movement occurs, a disturbance of the ratio of movement existing between the revolution of the screw and the reciprocating part, and the main object of the present invention is to produce a reciprocating movement wherein the reversal of the movement is secured without such disturbance.

With this object in view, the invention, broadly stated, consists of a cylinder having an endless screw-thread cut thereon; that is, a screw-thread which is formed around the cylinder throughout the extent of the desired reciprocating movement, and the thread then reversed so that it crosses the threads previously described, such threads preferably being in the form of a groove cut in the surface of the cylinder, and combining with this thread an element to be moved, having engagement with the thread. The element which engages with the thread, and moves in the groove when that form of thread is employed, is provided with means to insure that the said element shall continue in the groove at the point where the two grooves cross without shifting into the crossing groove; and means are also provided whereby, at the end of the reciprocation, the movement from one groove into the reversely formed groove shall be accomplished without changing the ratio of movement between the parts.

The endless screw may be propelled by any suitable regularly or irregularly moving motive power, such as a clock or other motor, or by means of a weight and float, or otherwise. The element reciprocated by the endless screw may be any one of a great variety of elements where such reciprocatory movement is found desirable.

For the purpose of illustrating the invention, it is shown herein as in the form of a water-stage recorder in which a reciprocating carriage bearing a suitable recording-style cooperates with a record-tablet to record the stage of water in a stream or well, or other location. In this instance, as a means of illustration, the endless screw is driven by a suitable belt, cable or chain passing over a friction or other wheel operatively connected to the endless screw, with a weight at one end of said cable and a float at the other end.

From what has been said, it will be understood that the inventive idea may receive a variety of mechanical expressions, one of which, for the purpose of illustrating the invention, is shown in the accompanying drawings, but it is to be expressly understood that such drawings are for purposes of illustration only and are not designed to define the limits of the invention, reference being had to the appended claims for this purpose.

In said drawings:—

Fig. 1 is a broken plan view of a water-stage recorder illustrating the invention and so much of the recorder as is necessary for this purpose;

Fig. 2 is a side elevation of Fig. 1;

Fig. 3 is a broken detail on the line 3—3 of Fig. 4 of the propelling screw, showing one end of the screw cylinder and the guide boat;

Fig. 4 is a sectional view on the line 4—4 of Fig. 3; and

Fig. 5 is a bottom plan view of the screw-engaging pin and guide boat.

Referring to the drawings, in which like reference numerals indicate like parts throughout the several views, 6, 6 indicate any suitable bearing-supporting standards in which cylinder 7 is mounted to turn, with its shaft 7' projecting through one of the standards and having a suitable pulley or other wheel 8 keyed thereon, over which pulley passes a suitable cable 9, which is preferably passed with a plurality of turns around the pulley wheel 8, and has on one of the depending ends thereof a float 10 and on the other a weight 11, said float resting upon the surface of a river or other stream whose water stage is to be recorded. This float-and-weight means of revolving the screw is simply illustrative of one form of motor which may be employed. It will be apparent to those skilled in the art that any other form of motor suitable for the particular purpose to which the movement is to be applied may be substituted therefor.

In the surface of the cylinder 7 are cut two screw-threads 12, 12' of uniform pitch but of reverse direction, so that the threads cross at the points 13, as clearly shown in Fig. 1, and at their ends the threads continue without modification of their pitch, so that they meet at a sharp point 14 (Fig. 1). These threads as here shown are in the form of grooves cut in the surface of the cylinder to a predetermined depth, and immediately opposite points 14 said cylinder is cut away as at 15, 15, but to a less depth than the grooves 12, 12', as will be clearly apparent from an inspection of Fig. 4.

The element to be reciprocated may be of any suitable form. As here shown, for the purpose of illustration it is in the form of a carriage 16 mounted on wheels 17, 17, traveling on suitable rails 18, 18', which rails as here shown are supported one above the other on the standards 6, 6.

As here shown, the carriage supports a recording-style 19, cooperating with a record-sheet 20, on a cylinder which is propelled by a weight 21, attached to a cable 22, wound on a drum 23, secured to said cylinder, the turning movement of the drum being controlled by a timing mechanism 24. As such carriage, style, drum and driving mechanism therefor form no part of the present invention, but may be of usual or any suitable or desired construction, the same need not be described herein with any further detail.

Referring now to Fig. 4, the carriage 16, which illustrates the element to be reciprocated, has secured thereto a pin 25 carrying on its end a roller 26, and also having thereon a freely turning sleeve 27, bearing a guide-shoe or boat 28 whose wings or arms extend radially on diametrically opposite sides of said sleeve and whose under surface is slightly concave as shown in Fig. 4, the roller 26 projecting outward beyond said concave surface of the boat or shoe 28.

The roller 26 on the end of the pin 25 takes into the groove 12, or 12' as the case may be, approximately to the full depth thereof, and as said roller moves along said grooves the guide or boat 28 extends into the grooves, but only to about one-half the depth thereof, said boat or guide serving to effectually bridge the points 13 (Fig. 1) where the grooves cross, to the end that the roller 26 will continue in the groove 12 or 12', as the case may be, until it reaches the junction point of said groove at either end thereof. At this point, referring now to Fig. 3, the guide or boat continues in the direction of the groove in which it is traveling until the roller 26 reaches the exact point of juncture of the two grooves as shown in Figs. 3 and 4. The left-hand side of the groove 12 (Fig. 3) is pressing against the left-hand side of the boat as viewed in Fig. 3, and quickly, and practically instantaneously, turns the same from the position shown in full lines and extending in the direction of the groove 12 to that shown in dotted lines and extending in the direction of the groove 12'. At this instant, the right-hand surface of the groove 12', as viewed in Fig. 4, advances past and reverses the direction of the motion of the roller 26 and consequently the pin 25 which carries the boat 28, and the boat or guide enters the groove 12', thus reversing the movement of the pin 25 and with it the carriage 16. This reversal is instantaneous, and the rectilinear movement of the pin constantly equals the pitch of the screw for each revolution of the latter. The sole function of the boat 28 is to carry the roller 26 across the points where the two grooves 12 and 12' intersect and maintain the roller in the proper groove. At all points the propulsion of the carriage 16 is accompanied by the engagement of the roller with the cam or screw grooves. As this instantaneous reversal occurs at each end of the cylinder where the cam grooves or screw-threads join, it will be seen that a constant reciprocating movement of the carriage 16 is secured dependent only upon the movement of the motor which is employed to revolve the cylinder 7. The reciprocating movements of the carriage, or other part, propelled by the cam grooves or screws will of course be dependent upon the particular operation of the motor, both as to speed and the continuity of movement. That is, if the motor is a continuously operated motor, the reciprocated part, here shown as the carriage, will continue to reciprocate as long as the motor is in operation, and if the motor is an intermittently operated one, as may sometimes be the case with the weight and float form of motor shown in the drawings, the movement of the reciprocated part will correspondingly vary.

What is claimed is:—

1. The combination of a reversely screw-threaded cylinder, a part movable in a right line parallel to the axis of said cylinder, a pin projecting from said part and entering the thread of said cylinder to approximately its full depth, a roller on the projecting end of said pin, said roller having a diameter approximately that of the width of the thread, a sleeve revoluble on said pin, and a guide-boat on said sleeve and entering said thread to only a portion of the depth thereof, whereby the reversal of movement at the point of juncture of the threads is obtained without disturbing the ratio of movement between the parts.

2. In combination, a reversely threaded cylinder whose reverse threads cross each other, an element movable in a right line parallel to the axis of said cylinder, means for revolving said cylinder, and two revoluble parts on said movable element engaging the threads on said cylinder at different depths, one of which said parts has a length greater than the width of the said threads.

3. The combination of a reversely threaded cylinder the threads of which meet at their respective ends, a movable part traveling in a right line parallel to the axis of said cylinder, a pin having a roller thereon entering the threads on the cylinder, and a guide-boat on the same axis as the roller and extending into said threads for only a portion of their depth, said cylinder having adjacent to the points of juncture of the said threads a cutaway portion permitting the turning of said guide-boat independently of the turning action of said roller, whereby the movement of the roller is entirely independent of the guide-boat and the latter can turn from one of said threads into the other independently of the action of the roller.

In testimony whereof I have signed this specification.

CARL H. AU.